A. J. KRAUSE.
INTERNAL COMBUSTION ENGINE.
APPLICATION FILED OCT. 10, 1921.
1,436,177.
Patented Nov. 21, 1922.
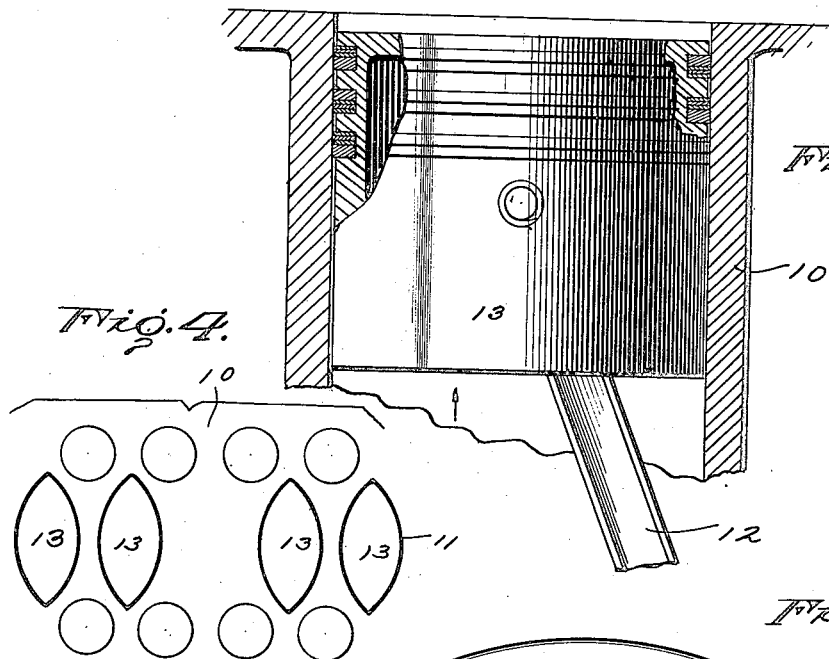
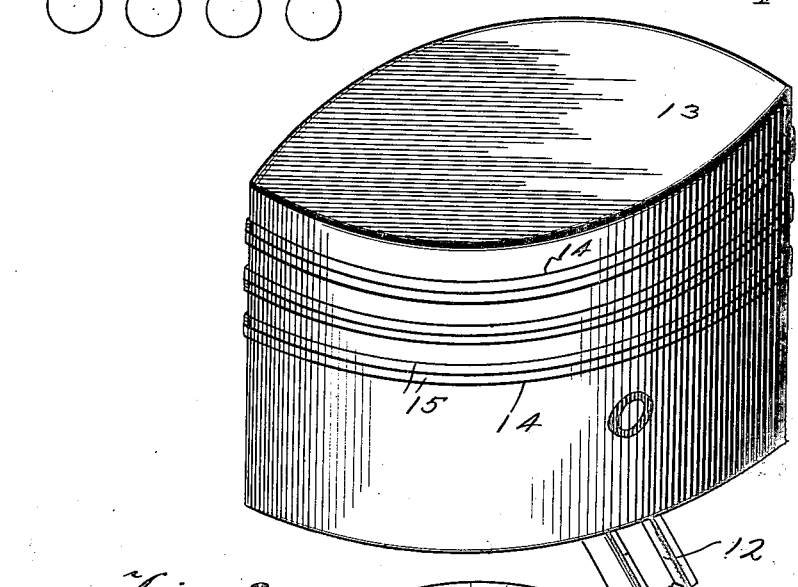
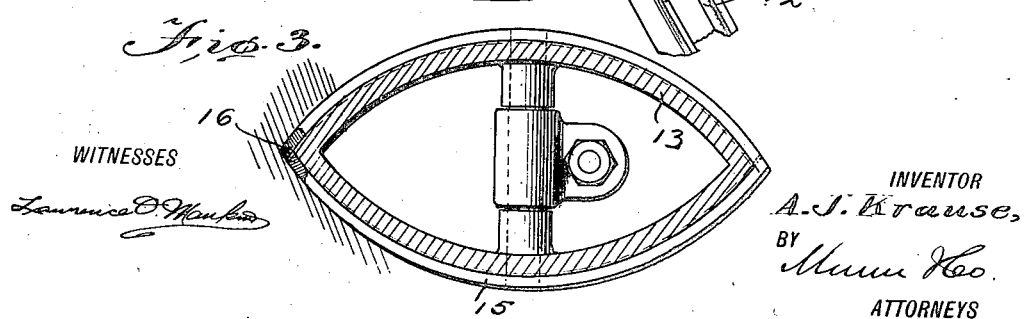
WITNESSES
INVENTOR
A. J. Krause,
BY
ATTORNEYS Patented Nov. 21, 1922.

1,436,177

UNITED STATES PATENT OFFICE.

ARTHUR JOSEPH KRAUSE, OF CLEVELAND, OHIO.

INTERNAL-COMBUSTION ENGINE.

Application filed October 10, 1921. Serial No. 506,785.

*To all whom it may concern:*

Be it known that I, ARTHUR J. KRAUSE, a citizen of the United States, and a resident of Cleveland, in the county of Cuyahoga and State of Ohio, have invented certain new and useful Improvements in Internal-Combustion Engines, of which the following is a specification.

My present invention relates generally to internal combustion engines and more particularly to that type of motor commonly known as a small bore long stroke motor, my primary object being the provision of certain means whereby with a small bore a much longer stroke will be permitted than that of which the usual cylindrical bore and piston are capable.

It is a well known fact that in all long stroke motors, the length of the stroke is limited by the lateral swing of the connecting rod of each piston in the lower portion of the cylinder diametrically of the latter and to increase the length of the stroke it thus becomes necessary to increase the bore of the cylinder and the diameter of the piston.

My improvement aims to permit of increase of the length of the stroke without increasing the area of the combustion space above the piston and to do this I propose an internal combustion engine having each of its piston chambers or bores of oval shape with its greatest axis at right angles to the longitudinal axis of the engine or in other words to the plane of the crank shaft so as to permit of maximum swing of the connecting rod.

In the accompanying drawing which illustrates my present invention and forms a part of this specification, Figure 1 is a vertical section taken transversely through a portion of the motor along the line of greatest diameter of one of the bores, with the piston therein partly broken away, Figure 2 is a perspective view of the piston removed, Figure 3 is a horizontal section through the piston in the plane of one of the piston ring grooves, and Figure 4 is a diagrammatic plan view of a cylinder block showing the arrangement of four pistons therein.

Referring now to these figures I have shown in Figures 1 and 4 a cylinder block 10 which in accordance with my invention has a bore or bores 11 of oval shape with their direction of greatest diameter at right angles to the longitudinal axis of the block or in other words at right angles to the crank shaft so that the connecting rod 12 of each piston 13 is permitted to swing in the direction of this greatest diameter and thus to a much greater degree than is possible with a cylindrical bore and piston having the same or nearly the same area of combustion space above the piston 13.

The piston 13 as particularly shown in Figures 2 and 3 is of the same shape as the receiving bore of the cylinder block 10 and is provided with ring grooves 14 in each of which a pair of rings 15 is preferably disposed.

Each ring is in one piece with its free ends 16 in overlapping relation in the plane of the greatest axis of the piston so that the rings will expand uniformly and evenly, the rings of each groove 14 being in reversed relation that is with the free ends 16 of one ring at one side of the piston and the free ends of the other ring at the opposite side of the piston.

Owing to the above shape and arrangement of the parts it is quite obvious that the advantages of the ordinary cylindrical form of the parts will be retained and in addition thereto a longer stroke in comparison to area of combustion space will be provided for.

An engine so constructed will have a more uniform torque, greater power and speed and will be much more economical in operation as compared with a motor of the usual type constructed to provide for the same length of stroke.

I claim:

1. A cylinder block for internal combustion engines having an oval cylinder whose direction of greatest diameter is disposed at right angles to the longitudinal axis of the block, and a similarly shaped piston movably interfitting said cylinder having a connecting rod swingable in the direction of the greatest diameter of the bore and piston.

2. A cylinder block for internal combustion engines having an oval piston bore and an oval piston movably interfitting the bore, having a connecting rod swingable in the direction of the greatest diameter of the bore and piston.

3. A cylinder block for internal combustion engines having an oval bore, an oval piston in the bore having a ring groove, and a pair of oppositely disposed rings in the groove, each ring having free ends overlapping in line with the direction of greatest diameter of the piston.

4. The combination with an engine cylinder having a transversely elongated bore, of a piston fitting said bore, and a rod connected to the piston and swinging in the direction of greatest diameter of the bore and piston.

ARTHUR JOSEPH KRAUSE.